Sept. 22, 1936.  F. M. BOWERS  2,055,117
FILTER GLASS HOLDER
Filed March 10, 1936
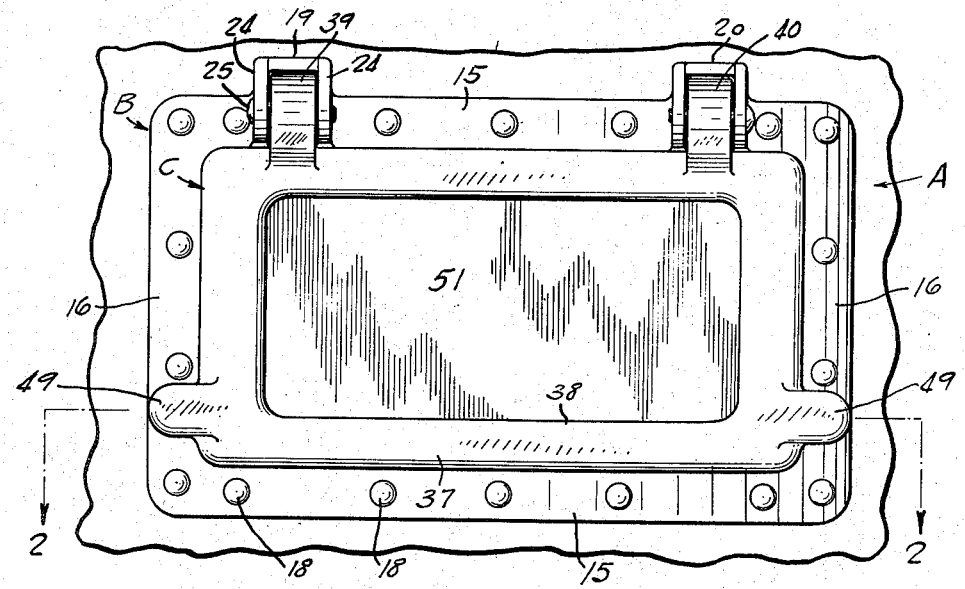
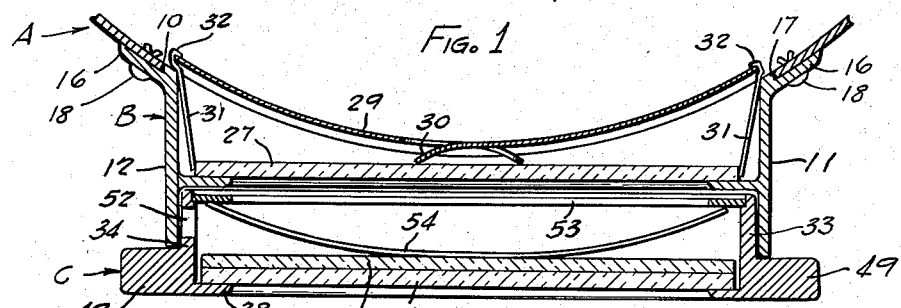
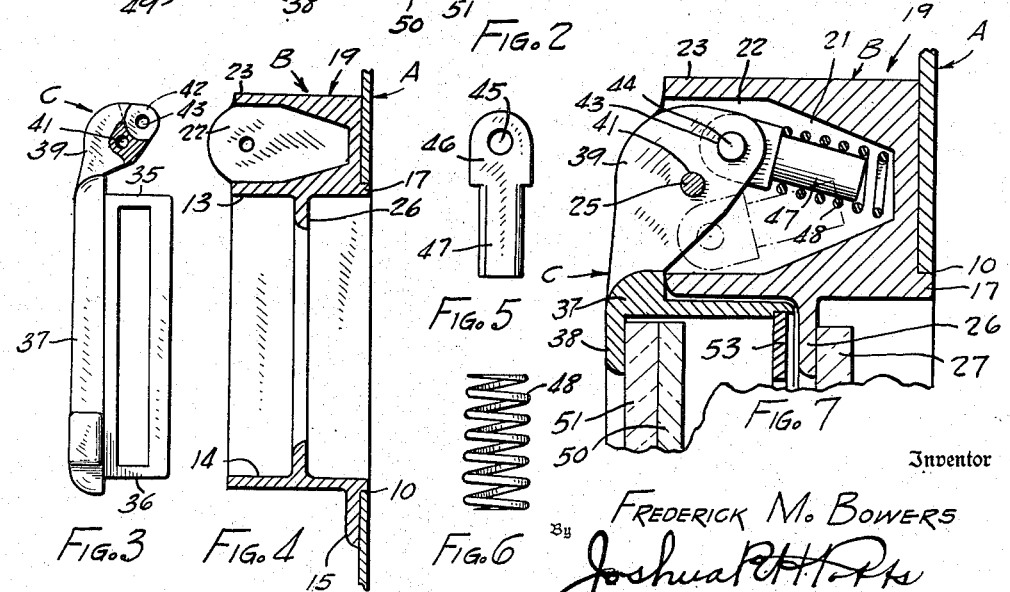
Inventor
FREDERICK M. BOWERS
By Joshua R H Potts
Attorney Patented Sept. 22, 1936

2,055,117

UNITED STATES PATENT OFFICE 2,055,117

FILTER GLASS HOLDER

Frederick M. Bowers, Chester, Pa.

Application March 10, 1936, Serial No. 68,072

3 Claims. (Cl. 2—8)

This invention relates to the art of protective devices, such as welding helmets and hand shields, which are commonly employed for protective purpose during welding operations.

Ordinarily protective devices of this character include an opening therein designed for vision purposes and structure is associated with this opening to provide for mounting a ray filter glass in proper position to filter the light coming from the welding operation.

In the use of protective devices of this type, it is important that the filter glass be movable into and out of its effective position. This is true because the filter glass usually restricts the vision and should be interposed between the eyes of the operator and the welding operation only when the latter takes place. When the welding is not being effected, it is common practice to move the filter glass out of its vision restricting position to permit of accurate inspection of the work.

Another condition with which this invention is concerned, is of flying particles of metal. The very nature of welding operations renders inherent the presence of this feature. These flying particles of metal have a deleterious effect upon the filter glass when they impinge thereagainst and these ray filters are an expensive item in the make-up of these filter devices.

With the foregoing conditions in mind, this invention has in view, as an important object, the provision of a protective device including a glass holder which is mounted on the device in a manner to permit of its movement into effective and ineffective positions, and the device includes means for yieldably maintaining the said glass holder in each of these said positions.

In carrying out this idea in a practical embodiment, a glass holder is provided for carrying a ray filter and this glass holder is hingedly mounted on the protective device. This hinged mounting permits of the holder being swung upwardly into a non-obstructing position, and spring means is provided for maintaining it in this position as well as in its vision restricting position.

Yet another object of the present invention is to provide glass holder mechanism comprising two parts which are hinged together and one of which is designed for fastening to the protective device, leaving the other hinged part free for swinging movement.

A more detailed object of the invention is to provide, in a glass holder of the character noted, a hinged part which includes means for yieldably maintaining one or more glass plates in position therein. With this arrangement, provision is made for mounting not only a ray filter in the holder, but also a cover glass therefor which constitutes a protection for said filter.

This invention also has in view the provision of a glass holder which includes a part designed for attachment to a protective device of the character noted and which part includes means for mounting a transparent glass plate therein.

Another important object of the present invention is to provide a glass holder including relatively movable parts, one of which is designed to maintain the ray filter and cover glass therefor. These parts interfit, and when assembled in interfitting position, removal of the ray filter and cover glass therefor is inhibited, but when the parts are separated, removal of this ray filter and cover glass is permitted.

This end is achieved by providing the part carrying the ray filter with a slot through which the plates are passed when they are assembled in this member. A spring is also included in this part and is effective to move the glass plates past the slot when the former have been inserted therein. Removal is accomplished by pressing the plates backwardly against the influence of the spring until they are aligned in the slot, whereupon they may be removed therethrough. This feature is of importance because it becomes necessary to replace the cover glass of the ray filter from time to time as the flying metal particles impinge against this element with a highly deleterious effect.

Various other more detailed objects and advantages, such as those associated with the provision of particular devices for carrying out the above noted objectives, will in part become apparent and in part be hereinafter stated as the description of the invention proceeds.

The invention, therefore, comprises a glass holder consisting of two parts, one of which is intended to be permanently secured to a protective device of the character noted, and the second of which is hinged to the first mentioned part. These parts interfit and the hinged holder part includes means for removably carrying a ray filter and one or more cover glasses therefor. Yieldable means are associated with the parts to maintain the hinged glass part either in vision-obstructing position, or in non-obstructing position, as occasion demands.

For a full and more complete understanding of the invention, reference may be had to the following description and accompanying drawing wherein:

Figure 1 is a view in front elevation of a glass holder made in accordance with the precepts of this invention, Figure 2 is a horizontal section of a glass holder taken about on the plane represented by the line 2—2 of Figure 1, Figure 3 is a side view partly in elevation and partly in section of one of the glass holder parts, Figure 4 is a vertical section through the other glass holder part, Figure 5 is a detailed view in elevation of a toggle pin which is included as part of the pivotal mounting between the glass holder parts, Figure 6 is a detailed view of the spring which is associated with the pin of Figure 5, and Figure 7 is an enlarged fragmentary view in section bringing out the manner in which the glass holder parts are arranged to provide for the movable part being maintained either in open or closed position.

Referring now to the drawing wherein like reference characters denote corresponding parts, a portion of a protective device such as a welding helmet or handshield is shown fragmentarily at A, and this device is provided with an opening, indicated at 10, in the form of a window which is intended to afford vision to the operator availing of the device. As shown in the drawings, this opening 10 is of a rectangular formation, with the top and bottom edges conforming to the curvature of the device A. Obviously, the invention is not to be limited in this respect as the size and shape of this opening may be varied, as circumstances dictate.

The glass holder of this invention is intended to be mounted in the opening 10, and this holder comprises two main parts which are referred to generally by the reference characters B and C. The part B is intended to be permanently secured to the device A about the edges of the opening 10, while the part C is hinged to the part B and operates in a manner to be hereinafter described.

The part B of the glass holder is of a rectangular formation, which is defined by sidewalls 11 and 12, a top wall 13, and a bottom wall 14. The top and bottom walls 13 and 14 are provided with flanges 15 that conform to the curvature of the cylindrical wall structure A while the sidewalls 11 and 12 are provided with similar flanges 16 that are substantially straight. These flanges 15 and 16 extend outwardly from the wall structure 11, 12, 13 and 14 at a point slightly spaced from the inner extremities thereof, leaving a small lip flange 17 of substantially the same breadth as the thickness of the wall A.

When the part B is assembled in the opening 10, the flanges 15 and 16 engage against the exterior face of the wall A, while the flange 17 enters into the opening 10 and engages the edges of the wall A thereabout. As shown in the drawing, the part B may be permanently secured in this position, in any preferred manner, such as by rivets designated 18.

The top wall 13 and its associated flange 15 are formed with a pair of hinge housings 19 and 20, which are spaced apart, as shown in Figure 1, and are preferably formed integral with the top wall 13 and flange 15. These housings 19 and 20 are of a duplicate construction and the details of only one is, therefore, here set out for the purpose of this description.

The hinge housing 19 is shown in Figure 7 as formed with a truncated pyramidal recess 21 which terminates in a rectangular opening 22 that is defined by the wall structure of the housing 19, which wall structure includes the top wall 13 of the glass holder part B as the bottom of the hinge housing 19. The latter is also formed with a top wall 23 and sidewalls 24. A pivot pin 25 extends across the rectangular opening 22, between the sidewalls 24, to mount the other hinge part in a manner to be later described.

Extending inwardly from the wall structure 11, 12, 13 and 14, along a line intermediate the extremities of this wall structure, is a flange in the form of a rib 26. Positioned on the inner side of the rib 26 is a clear glass plate 27 which is held in position by a leaf spring shown at 29, which spring 29 is formed with fingers 30 that engage the plate 27. As shown in Figure 2, clips 31 having grooved ends at 32, which receive the notched extremities of the spring 29, are included in the assembly to prevent relative lateral movement of the plate 27.

During the ordinary use of the protective device it is intended that the clear glass plate 27 always be interposed between the eyes of the wearer and the welding operation, so that the operator is at all times protected from flying particles of molten metal.

The hinge part C comprises a flange defined by sidewalls 33 and 34, a top wall 35, and a bottom wall 36. As shown in Figures 2, 3 and 4, the wall structure 33, 34, 35 and 36 is dimensioned to provide for an interfit in the corresponding wall structure of the glass holder part B. This wall structure 33, 34, 35 and 36 is enlarged, as indicated at 37, and the enlarged portion is provided with an inwardly extending flange 38. The top wall 35 and that portion of the enlargement 37 associated therewith is provided with a pair of spaced hinge lugs 39 and 40, which cooperate with the hinge housings 19 and 20, to pivotally mount the glass holder part C with respect to the part B. Each of these lugs 39 and 40 is formed with an opening 41 through which extends the pivot pin 25 to provide the pivotal mounting.

These lugs 39 and 40 are also of duplicate construction, and, as clearly shown in Figure 7, the lug 39 is enlarged beyond the opening 41 to provide ears 42 which are formed with openings 43. A pin 44 extends through the openings 43, and also through an opening 45 which is formed in the head 46 of a toggle pin 47. Disposed about the pin 47 and engaging at one end the head 46 and at the other end the bottom of the truncated or pyramidal recess 21, is a coil spring 48 which is compressed so that it always has a tendency to expand.

As shown in Figure 7 the toggle pin 47 and associated spring 48 assumes either the full or the dotted line position. In the full line position the spring 48 is effective to yieldably maintain the glass holder part C in closed position while this part C will be maintained in an opened position when the toggle pin 47 is in the dotted line position, the movement from the closed to the open position being accommodated by the free play afforded the toggle pin 47 by its mounting in the hinge housing 19.

As shown in Figure 1, the enlarged portion 37 of the glass holder part C may be provided with a pair of operating members in the form of projections shown at 49. These projections 49 are intended to be grasped by the operator when the part C is to be swung upwardly or lowered, as the case may be.

The glass holder part C is intended to carry a ray filter which is designated 50, and which is provided with a cover glass indicated at 51. To the end of removably positioning the filter glass 50 and its associated glass 51 in the glass holder part C, the sidewall 34 is provided with a slot at 52, which is spaced from the flange 38. A backing frame 53 is secured to the wall structure 33, 34, 35 and 36 at the inner extremity thereof, in any preferred manner, as by welding or soldering. A leaf spring shown at 54 takes the form of a bow and has each end thereof resting against the backing frame 53. It is notable that the bow or central portion of the leaf spring 54 extends beyond the slot 52.

In assembling the cover glass 51 and ray filter 50 in the glass holder part C, the latter is first swung on its hinged structure so that the interfit of the part C in the part B is broken. The cover plate 51 may now be inserted through the slot 52, at which time the spring 54 will be depressed.

After the cover glass 51 has been completely passed through this slot 52, the spring 54 will be effective to urge it forwardly against the inturned flange 38. The ray filter 50 may now be passed through the slot 52 whereupon the spring 54 also presses the ray filter 50 against the cover glass 51, in the manner shown in Figure 2.

In this connection it is notable that the arrangement illustrated develops the use of only one cover glass 51. A second glass cover might just as well be associated with the ray filter 50 on the inner side of the latter, although in the preferred embodiment this arrangement is not thought necessary due to the presence of the clear glass plate at 27.

When the part C is swung down to interfit with the part B, the sidewall 12 of the latter is effective to positively preclude any removal of the ray filter 50 or cover glass 51 in this position. Under conditions of actual usage the part C will be maintained in downward interfitting position with the part B by the spring toggle arrangement disposed in the hinge housings 19 and 20, during that time in which the welding operations actually take place. In this position the ray filter 50 is effective to afford protection to the eyes of the operator from ultra-violet and infra-red rays, and the cover glass 51 constitutes a protective device for the ray filter 50.

When welding is discontinued, accurate inspection may be made by the operator by availing of the projections 49 to raise the part C into an upward or open position, in which position it is maintained by the spring toggle arrangements in the hinge housings 19 and 20, which have now assumed the positions indicated by the dotted lines shown in Figure 7.

In this upward or open position of the glass holder part C, only the clear glass plate 27 is interposed between the eyes of the operator and the work, and the transparent nature of this plate 27 shall in no way be detrimental to the observation of the work.

While a preferred specific embodiment of the invention is herein set forth, it is to be clearly understand that I am not to be limited to the exact construction illustrated and described, because various modifications of these details may be provided in putting the invention into practice, within the purview of the appended claims.

I claim:—

1. A device of the character described comprising a glass holder part including means for attaching the same to a protective device, said glass holder part being formed with a hinge housing, a second glass holder part having a lug extending into the hinge housing, a pin for establishing a pivotal connection between the lug and hinge housing, said lug being formed with an ear disposed on one side of the pin, a toggle pin pivotally attached to said ear and formed with a head, and a spring disposed in said housing about said toggle pin and engaging the head thereof at one end and the bottom of the housing at the other.

2. A device of the character described comprising a glass holder part including means for attaching the same to a protective device, said glass holder part being formed with a hinge housing, a second glass holder part having a lug extending into the hinge housing, a pin for establishing a pivotal connection between the lug and hinge housing, said lug being formed with ears disposed on the inner side of said pin, a toggle pin having a head located between said ears, a pin passing through aligned openings in said ears and head, and a coil spring disposed about said toggle pin engaging the bottom of the housing at one end and the head of the pin at the other.

3. A device of the character described comprising a glass holder part including means for attaching the same to a protective device, said glass holder part being formed with spaced hinge housings, a second glass holder part formed with lugs projecting into the hinge housings, pivot pins for establishing a pivotal connection between the lugs and the housings, said second glass holder part being formed with a flange which is enclosed by the first mentioned glass holder part when the said parts are assembled in closed position, said flange being formed with a slot adapted to have a filter glass passed therethrough, and means for maintaining the filter glass assembled in the second glass holder part, and means for yieldably maintaining said second glass holder part in open or closed position with respect to the first mentioned glass holder part and which means consists of a spring actuated toggle disposed in each of the hinge housings and operatively associated with the said lugs.

FREDERICK M. BOWERS.